United States Patent [19]
Sagliano et al.

[11] Patent Number: 5,820,916
[45] Date of Patent: Oct. 13, 1998

[54] METHOD FOR GROWING AND PRESERVING WHEATGRASS NUTRIENTS AND PRODUCTS THEREOF

[76] Inventors: Frank S. Sagliano; Elizabeth A. Sagliano, both of 16178 Forzando Ave., Brooksville, Fla. 34609

[21] Appl. No.: 799,358

[22] Filed: Feb. 14, 1997

[51] Int. Cl.⁶ .................................. A23L 2/04; A23L 2/14
[52] U.S. Cl. .................. 426/636; 426/385; 426/590; 426/599; 426/444; 47/59; 47/61; 47/62
[58] Field of Search ...................... 426/385, 590, 426/599, 636, 444; 47/59, 61, 62

[56] References Cited

U.S. PATENT DOCUMENTS

| | | | |
|---|---|---|---|
| 2,350,982 | 6/1944 | Borst | 47/59 |
| 3,664,061 | 5/1972 | Oepen | 47/59 |
| 3,804,960 | 4/1974 | Barnett et al. | 426/385 |
| 4,104,414 | 8/1978 | Rahman et al. | 426/385 |
| 4,959,926 | 10/1990 | Moffet, Jr. | 47/59 |
| 5,287,652 | 2/1994 | Delp | 47/59 |
| 5,407,696 | 4/1995 | Hagiwara et al. | 426/636 |
| 5,445,839 | 8/1995 | Hagiwara et al. | |
| 5,588,254 | 12/1996 | Adachi et al. | 47/57.6 |
| 5,706,602 | 1/1998 | Kohno et al. | 47/57.6 |

*Primary Examiner*—Helen Pratt
*Attorney, Agent, or Firm*—Dorothy S. Morse

[57] ABSTRACT

A method for growing and preserving nutrients in plant material, particularly wheatgrass, which produces a nutritional supplement for humans and non-human animals having optimally high enzyme, mineral, and trace mineral contents, as well as a minimum protein content of forty percent. The method includes growing the plants in the field, as well as in greenhouses, hydroponically and airponically, or in a lightweight growth medium such as a mixture of sawdust and vermiculite, so that nutrients available to the plants during growth can be controlled. Plants are also watered frequently during growth with commercially available fertilizers or other specially prepared electrolyte nutrient solutions. Both the upper plant tissue and the plant roots can be harvested, and juiced or pressed to separate the plants tissue liquid from the fibrous portion of the plant by use of extractors that will not allow the temperature of the plant juice to exceed 90° Fahrenheit. Subsequent to juicing, the plant juice is immediately freeze dried using a pharmaceutical type of freeze drier.

20 Claims, No Drawings

METHOD FOR GROWING AND PRESERVING WHEATGRASS NUTRIENTS AND PRODUCTS THEREOF

BACKGROUND—FIELD OF INVENTION

This invention relates to methods for growing and preserving plant material, specifically to a method, and product there of for growing and preserving nutrients in plant material intended as a food supplement which optimizes enzyme, mineral, trace mineral, and protein levels within the preserved plant material. Applications may include, but are not limited to, the growth and preservation of grasses, as well as other food supplements and food products, to offer the world population high levels of protein, enzymes, minerals and trace minerals which are in a form readily absorbable by the human digestive system, in addition the growth and preservation of plant material having specific nutrient assays for use in providing people with particular combinations of nutrients which enhance their ability to resist disease, overcome disease, and to rapidly repair skin afflictions and lacerations.

BACKGROUND—DESCRIPTION OF PRIOR ART

With the world population continuing to grow, hunger and malnutrition becoming more prevalent in certain parts of the world, and the nutritional value of some commonly consumed foods declining due to nutritionally exhausted soils, new sources of food and nutritional food supplements will be increasingly sought to sustain the world population in optimum health. Although protein content is important to the human diet, readily absorbable minerals and enzymes are also needed for good health. While minerals are available from both organic and inorganic sources, generally the minerals obtained from organic sources have been shown to be more readily absorbable by the human body than those available from inorganic sources.

A current dietary guideline, generally accepted as one of many ways in which people can sustain good health, dictates that human adults should eat a minimum of five servings of fruits and vegetables per day. Ideally those fruits and vegetables should contain as many as possible of the essential substances, such as vitamins, minerals, trace minerals, fiber, enzymes, and the like, needed daily by humans for good health. However, the vitamin and mineral content of fruits and vegetables varies with its handling after harvest, for example whether it is cooked, how it is cooked, and how long a time lapses between harvest and consumption. The vitamin and mineral content of fruits and vegetables also varies depending upon the nutrients available to its plant's roots during growth, and many of the fruits and vegetables available in markets today are not subjected to growing conditions which optimize the levels of vitamins and minerals contained therein. Therefore, consumers are generally not able to rely upon fruits and vegetables currently available in the marketplace to provide them with an adequate vitamin and mineral content to sustain good health. The vitamin and mineral contents of currently marketed fruits and vegetables have been found to vary widely, the same variety of fruit or vegetable sometimes having different vitamin and mineral contents as a result of being grown in a different the geographical location , and people will increasingly have to look to alternative food sources, or nutritional food supplements, as a source of the readily absorbable vitamins, minerals, trace minerals, chlorophyll, and enzymes that they will need to maintain good health and enhanced immunity to disease.

Grasses have been known in many cultures worldwide to have regenerative and health protecting properties for animals, including humans. Biblical references in Isaiah that "All flesh is grass." also acknowledge this concept. Wheatgrass is one grass that has been demonstrated to be of particular use to humans as a nutritional source of vitamins, enzymes, minerals, and trace minerals, in addition to its topical use, including such topical uses as on scalp tissue to increase the luster of a person's hair, as a skin cleanser, as an astringent, as an eyewash if its juice is finely strained, to unblock sinuses, to soothe sunburn, in bath water to enhance skin circulation, and as a treatment for burns, cuts, and bedsores. Advantages of using wheatgrass are that it is a fast growing grass, its seeds are easily obtained, and it is inexpensive to procure and use. Although not restricted to growth in trays, for a few cents a tray, wheatgrass can be grown in seven days and will yield approximately seven to twelve ounces of juice per tray, depending on the size of the tray used. Two to four ounces of wheatgrass ingested drunk daily is thought to be sufficient to provide optimum nutritional enhancement for a healthy adult human being. Wheatgrass is a good source of calcium, iron, sodium, potassium, and magnesium, as well as trace minerals, all B vitamins, provitamin A, vitamin E, and vitamin K. In addition, wheatgrass has seventeen amino acids, eight live enzymes, and chlorophyll. Wheatgrass is usually juiced and used in liquid form, and since its nutrients are already in solution they can be rapidly assimilated through a person's digestive system. Although wheatgrass has many advantages as a nutritional food supplement, several disadvantages in its preservation and growth have prevented wheatgrass from receiving widespread use. One disadvantage is that wheatgrass juice starts losing its nutrient potency almost immediately after the juicing process is complete. Therefore, use of wheatgrass as a food supplement was limited mainly to individuals who grew it in their own kitchen or in basement gardens. The space required for housing of the growth trays, the barrels needed for storage of the growth medium as well as the composted wheatgrass mats, and the seed soaking equipment needed to start the wheatgrass sprouts, were also limiting factors which discouraged widespread use of wheatgrass by individuals. Further, the time required to grow and juice the wheatgrass prevented others from using wheatgrass as a food supplement. Although attempts were made to commercially preserve wheatgrass through vacuum drying processes, the elevated temperatures to which the product was exposed during such processing made for a resulting product that was inconsistent in composition, had a poor flavor, and was diminished in nutrient assay, particularly showing a marked decrease in levels of viable enzymes.

Further, prior art methods of growing wheatgrass did not optimize the nutrient content of the wheatgrass product. One commonly used growing method comprised the use of a mixture of fifty percent top soil and fifty percent peat moss, or in the alternative a mixture of fifty percent top soil and fifty percent composted used wheatgrass mats. The prior art method contemplated the use of two barrels of top soil and one half of a bale of peat moss to provide the amount of growth medium necessary for several weeks of wheatgrass growth. In this prior art method, one cup of wheatgrass berries would be washed, covered with water, and left to sit overnight. The wheatgrass berries would then be drained, rinsed, and left to sprout in a jar placed at a 45 degree angle for twelve hours. One inch of soil, such as 50%—50% top soil and peat moss mixture, would be placed in a tray. The sprouted wheatgrass seeds would then be evenly spread over the soil with the seeds touching but not stacked upon one another. The sprouted seeds would then be sprinkled with water and covered with an empty tray to provide an enclosed growth environment. After 2–3 days, the wheatgrass seeds would be uncovered, watered again, and set in indirect sunlight. Every 24–48 hours the sprouts would be watered to keep its soil moist, and after 6–12 days, or when wheatgrass is approximately 7–10 inches tall, but always before first jointing of the sprouts, the wheatgrass would be harvested by cutting it close to the soil with a knife. The wheatgrass would then be stored in the refrigerator for up to seven days before juicing. Nutrients in the wheatgrass juice begin to be lost within one-half of an hour after juicing, therefore wheatgrass juice should be used within twelve hours or it should be discarded. Trays of wheatgrass would be recut once or twice, then its matted roots would be composted and reused to enhance the growth medium for preparation of additional trays for the growth of sprouted wheatgrass berries. In the alternative, the matted roots can also be juiced.

In contrast, the method of the present invention provides a growth medium that is lighter and easier to work with through the use of a fifty percent-fifty percent mixture of sawdust and vermiculite. Such a growth medium also provides for easier control of the nutrients available to the wheatgrass as it is grown. Wheatgrass seeds are coated with a seed coating comprising a low concentration N—P—K fertilizer to insure germination. The coated seeds are then placed upon a minimum of one inch of the sand and vermiculite growth medium in trays, or alternatively in the field, and then covered with an additional amount of growth medium. Wheatgrass seeds are then watered two to three times per day with liquid fertilizers having a nutrient mixture ranging between 6N, 10P, 25K and 12N, 25P, 29K, that also contains a high magnesium content, preferably a mix of the 6N, 10P, 25K and 12N, 25P, 29K fertilizers. In the preferred method, ION 2000 ®fertilizer, or a similar electrolyte nutrient solution, is used which comprises secondary plant nutrients derived from seaweed, kelp, and chelated minerals. After eight to fourteen days of growth, at first node stage and just before first leafing, the wheatgrass is cut by any efficient cutting method and either immediately juiced or pressed, placed temporarily under refrigeration, or juiced or pressed and subsequently sealed and rapidly frozen for later freeze drying. During juicing care must be taken that the juicing process does not heat the wheatgrass to a temperature over 90° F. Also, a slow speed juicer, or a low pressure hydraulic press, which generates no heat greater than 90° Fahrenheit in the wheatgrass juice, is also preferred over a high speed juicer as the slow speed juicer will separate more juice from the wheatgrass fiber. Within one-half hour of juicing or pressing, the wheatgrass juice is freeze dried through the use of a pharmaceutical freeze drying apparatus, or the type of freeze drying apparatus created by Royal Lee which uses a cold sterilization technique of freeze drying that preserves the bioactivity of the nutrient contents in the freeze dried product. During the freeze drying process, the temperature of the freeze drier is maintained so as to keep the wheat grass juice below freezing. Also, since the pharmaceutical, or Royal Lee type, freeze drying apparatus operates so as to evaporate water from the wheatgrass juice, it will never burn the wheatgrass, thereby preventing the final product from having a bitter taste. The freeze dried wheatgrass juice is then placed into bottles which have been oxygen diffused, or into individual packages each holding one daily dose of wheatgrass powder which can be used dry, or reconstituted in water or juice for drinking. Although not limited to such uses, the wheatgrass powder can also be added to other edible products such as canned and packaged fruits and vegetables, pet food items, baby food, topical preparations used for applications such as facials and the rapid healing of cuts and burns, and internal preparations used for such applications as enemas, douches, and colonics. The wheatgrass powder is not made into compressed tablets as the pressure used for such compression would diminish the active enzyme content of the product. Wheatgrass powders obtained by prior art preservation methods, including those incorporating a freeze drying step, have only contained a maximum protein content ranging between thirty and forty percent, and often at least some of the enzymes in the wheatgrass were destroyed during its processing. The method of the present invention for growing and preserving wheatgrass nutrients has consistently achieved a wheatgrass powder containing a minimum of forty percent protein. It is not known to have a method for growing and preserving wheatgrass nutrients which produces a nutritional food supplement consistently achieving protein assays exceeding forty percent and which also has optimally high levels of live enzymes and readily absorbable minerals as well as trace minerals for use in maintaining good human health and enhanced resistance to disease.

SUMMARY OF INVENTION—OBJECTS AND ADVANTAGES

It is the primary object of this invention to provide a method for growing and preserving wheatgrass nutrients which results in a nutritional food supplement having protein levels consistently exceeding forty percent. It is also an object of this invention to provide a method for growing and preserving wheatgrass nutrients which results in a nutritional food supplement having optimally high levels of live enzymes, minerals, and trace minerals which are readily absorbable into the human digestive system. A further object of this invention is to provide a means of juicing or pressing the wheatgrass which does not heat the wheatgrass juice above 90° F. so as to not diminish levels of live enzymes therein. It is also an object of this invention to provide a method for growing and preserving wheatgrass nutrients which incorporates a means of freeze drying wheatgrass juice which does not allow the wheatgrass juice to exceed freezing during the freeze drying process, nor impart a bitter taste to it.

As described herein and properly executed, the method of the present invention would provide a more controlled environment for the growing and preservation of nutrients in wheatgrass juice so that the wheatgrass powder produced thereby has a higher assay of nutrients available for the enhancement of human health. The present method uses a low speed juicer, or a low pressure hydraulic press, which each minimize heat generated during the juicing and pressing processes, to ensure that the temperature of the wheatgrass juice does not exceed 90° F. Also, the pharmaceutical freeze drier, or Royal Lee type of freeze drier, used does not allow the temperature of the wheatgrass juice to exceed freezing during the freeze drying process. Further, nutrients required for optimal plant growth are added to the growth medium through commercially sold liquid fertilizers, or other specially prepared electrolyte nutrient solutions, which would permit the growth of plant material with targeted amounts of nutrients for use in assisting people to more rapidly recover from specific human diseases. Use of the pharmaceutical, or Royal Lee type, of freeze drying apparatus with a vacuum to separate the water in the wheatgrass juice from the mineral, nutrient, and protein portion of the wheatgrass juice, thereby prevents the wheatgrass powder produced from becoming burnt and having a bitter taste. Also, since the nutrients in the wheatgrass juice were in solution before the freeze drying process, nutrients in the freeze-dried wheatgrass powder remains one-hundred percent available for body metabolism, without a person's body having to expend energy to breakdown the nutrients before they become available for the body's use. The wheatgrass powder can be used dry, or reconstituted in water or juice for drinking. The wheatgrass powder can also be added to other products. It is calculated that two teaspoons of the wheatgrass powder obtained by the present invention method would yield a nutrient level equivalent to approximately one-and-one-half pounds of organically grown or naturally grown vegetables when consumed by human adults. The method of the present invention for growing and preserving wheatgrass nutrients has consistently achieved wheatgrass powder containing a minimum of forty percent protein. It is not known to have a method for growing and preserving wheatgrass which obtains a nutritional food supplement consistently achieving protein assays exceeding forty percent protein and which also has optimally high levels of live enzymes and readily absorbable minerals for maintaining good human health and enhanced resistance to disease.

The description herein provides preferred embodiments of the present invention but should not be construed as limiting the scope of the wheatgrass growth and preservation invention. For example, variations in the amount of wheatgrass juice freeze dried at one time, the number of times per day that the wheatgrass spouts are watered with fertilized solution, and the number of times each wheatgrass plant is recut, other than those shown and described herein, may be incorporated into the present invention. Thus the scope of the present invention should be determined by the appended claims and their legal equivalents, rather than being limited to the examples given.

BRIEF DESCRIPTION OF THE DRAWINGS

There are no drawings provided with this application.

DETAILED DESCRIPTION OF PREFERRED EMBODIMENTS

The present invention comprises a method for growing and preserving nutrients in wheatgrass juice so that the wheatgrass powder produced therefrom has a high assay of nutrients available for use as a food supplement for enhanced human health. Laboratory analysis has determined that one teaspoon of the wheatgrass product produced by the method of the present invention, and having a moisture content of approximately eight percent, comprises approximately 1 gram of weight and approximately 3 calories; 0.4 grams of protein; 0.2 grams of carbohydrate; 0.3 grams of fat; 0.1 milligram of sodium; 2.5 milligrams of potassium; 0.005 milligrams of boron; 4.5 milligrams of calcium; 0.45 milligrams of chloride; 1.1 micrograms of chromium; less than 0.5 micrograms of cobalt; 25 micrograms of copper; 6.0 micrograms of fluoride; less than 10 micrograms of germanium; less than 0.5 micrograms of iodine; 0.047 milligrams of iron; 4.0 milligrams of magnesium; 24 micrograms of manganese; less than 0.5 micrograms of molybdenum; less than 0.5 micrograms of nickel; 27 milligrams of phosphorus; 2.5 milligrams of potassium; less than 0.05 micrograms of selenium; 150 micrograms of silicon; 0.1 milligrams of sodium; less than 0.5 micrograms of tin; less than 0.5 micrograms of titanium; less than 0.5 micrograms of vanadium; 61 micrograms of zinc; 1.1 milligrams of chlorophyll; less than 0.01 grams of cholesterol; 9.0 micrograms of thiamin (B 1); 0.08 milligrams of niacin (B3); 2.8 micrograms of riboflavin (B3); 0.01 micrograms of cyanocobalamin (B 12); 6 micrograms pyridoxine hydrochloride (B6); 1.1 micrograms of folic acid; 0.1 micrograms of biotin; less than 10 micrograms of inositol; 18 micrograms of pantothenic acid; 0.2 international units of Vitamin E; less than 0.1 international units of Vitamin D; 1.0 micrograms of choline; 170 micrograms of Vitamin C; 460 international units of retinol (Vitamin A); less than 1 percent fiber; 39 percent mineral ash; 43.1 milligrams of aspartic acid; 43.5 milligrams of glutamine acid; 22.8 milligrams of alanine; 14.5 milligrams of isoleucine; 18.2 milligrams of phenylalanine; 20.3 milligrams of arginine; 13.6 milligrams of threonine; 15.7 milligrams of proline; 20.3 milligrams of valine; 28.9 milligrams of leucine; 6.8 milligrams of histidine; 14.6 milligrams of serine; 18.7 milligrams of glycine; 3.2 milligrams of methionine; 6.3 milligrams of tyrosine; and 20.7 milligrams of lysine.

The method of the present invention contemplates growth of wheatgrass, or other plants, so that the nutrients available to the plants can be strictly controlled. In the preferred embodiment of the present invention a growth medium that is light and easy to work with is used, such as one containing an approximate fifty percent-fifty percent mixture of sawdust and vermiculite, or the plants are grown hydroponically or airponically during which they are supported without a growing medium by structures which allow the plant foliage and/or roots exposure to nutrient solutions. When a growth medium is used, no less than one inch of it is placed in trays or in the field as a base layer for support of the wheatgrass seeds. The growth medium can be soaked prior to the planting of seeds. Wheatgrass seeds are then coated with a seed coating before planting. In the preferred embodiment a seed coating is used comprising approximately one tablespoon of a low N—P—K fertilizer mixed in two ounces of water and which is then applied to approximately two pounds of seeds. The coated seeds are then placed upon the growth medium and an additional amount of the growth medium sufficient to cover them being placed upon the seeds. The wheatgrass, or other, seeds are watered two to three times per day with fertilizer mixtures ranging from 6N, 10P, 25K to 12N, 25P, 29K which also contain a high magnesium content. In the preferred method, it is contemplated for ION 2000 ®fertilizer, or specially prepared electrolyte nutrient solutions, to be used which comprises secondary plant nutrients derived from seaweed and kelp. The ION 2000 ®fertilizer, or the specially prepared electrolyte nutrient solutions, would also comprise an N component having approximately 0.62% ammoniacal nitrogen; 5.20% nitrate nitrogen; 0.18% water soluble organic nitrogen; a P component derived from mono-ammonium phosphate and available as phosphoric acid; and a K component available as potash; as well as 0.5% calcium; 0.02% manganese; 0.005% molybdenum; 0.02% iron; 0.02% boron; 0.02% copper; and 0.02% zinc. For routine use in the preferred embodiment it is contemplated for one pound of the ION 2000 ® fertilizer to be mixed with clean water and stirred vigorously. In the alternative amounts of a 6N, 10P, 25K fertilizer can be mixed with a 12N, 25P, 29K fertilizer to enhance magnesium and calcium levels available for plant growth. In the preferred embodiment, for optimum growth, approximately one pound of dry fertilizer, a mixture containing between 6N, 10P, 25K and 12N, 25P, 29K, is mixed into approximately forty-four gallons of water. Nutrients derived from a process commonly referred to as rotting rock could also be used, in which solid rock is broken down into soluble nutrients through microbial action. For continuous feeding, and for young plants, sixteen ounces of the first prepared optimal growth solution can be further diluted to one hundred gallons of water and used with injectors set 1:500 for ten one-minute feedings daily. The dry ION 2000 ® fertilizer is stored in a cool dry place and tightly covered between uses.

After an elapsed time period of between eight and fourteen days, when the wheatgrass growth is at the first node stage, and just before first leafing, the wheatgrass is cut by a sharp instrument and either immediately juiced, temporarily placed under refrigeration, or juiced or pressed, and sealed and quickly frozen for later freeze drying. The plants roots may also be juiced or pressed to yield juice. If the wheatgrass is refrigerated, it is contemplated for the wheatgrass to be stored under refrigeration no longer than seven days. Also, the means by which the wheatgrass is cut is not critical to the present invention and the cutting can be performed by any efficient cutting method and tool. The means of juicing or pressing the wheatgrass is monitored so that the temperature of the juice does not exceed 90° F. High speed juicers are avoided due to the elevated temperatures they can cause in the materials being juiced. Many juicers are sold with a fine mesh screen and a larger mesh screen. In the preferred embodiment the larger screen is preferred to obtain more product, and more fiber in the finished product. As an alternative to juicing, the wheatgrass may be pressed using a low pressure hydraulic press which does not allow the plant material to become heated to temperatures exceeding 90° F. Also, within one-half hour of juicing, the wheatgrass juice is freeze dried through the use of a pharmaceutical freeze drying apparatus which more carefully controls temperatures during the freeze drying process to constantly maintain the temperature of the product below freezing. In the preferred embodiment it is contemplated for a pharmaceutical freeze drier to be used, such as one made by the Virtis manufacturing company, or one manufactured or designed by Royal Lee which incorporates cold sterilization techniques into its freeze drying process that preserve bioactivity in the nutrient content of a freeze dried product. Also, the pharmaceutical freeze drying apparatus bakes the wheatgrass juice to evaporate water from it, preventing it from burning the final product which would give it a bitter taste. The step of freeze drying the wheatgrass juice within one-half of an hour of its juicing is critical to the present invention.

Once dried into a powder, the freeze dried wheatgrass juice is placed into bottles which have been oxygen diffused, or into individual packages each holding approximately one teaspoon of wheatgrass powder which can be used dry, or reconstituted in water or juice for drinking. It is also contemplated for the wheatgrass powder to be added to other products, including food products and topical preparations. The wheatgrass powder is not made into compressed tablets as the pressure used for such compression would diminish the active enzyme content of the final product. Wheatgrass powders obtained by prior art preservation methods, including freeze drying, have usually been limited in maximum protein content to a concentration ranging between thirty and forty percent, and often some of the enzymes in such wheatgrass products are destroyed by elevated temperatures used as part of their processing. The method of the present invention for growing and preserving wheatgrass has consistently achieved a powdered wheatgrass product containing protein levels exceeding forty percent, and has achieved protein levels testing as high as forty-seven percent.

Since in the preferred embodiment the nutrients required for plant growth are added to the sawdust and vermiculite mixture through the liquid ION 2000° fertilizer solution, it is easily possible through use of the method of the present invention to cause the growth of plant material with targeted amounts of nutrients. Fruits and vegetables having a targeted mix of nutrients in their content can be used by people to more rapidly recover from diseases caused by specific nutritional deficiencies. The powdered product produced by the present invention is easily consumed as it can be eaten in dry form, or reconstituted in water or juice for drinking. The powdered product resulting from the method of the present invention can also be consumed in other food products, such as when it is added to canned and packaged fruits and vegetables, party dips, pet items, and baby food. It is calculated that two teaspoons of the wheatgrass powder obtained by the present invention method would yield a nutrient level equivalent to approximately one-and-one-half pounds of organically or naturally grown vegetables when consumed by humans. The method of the present invention for growing and preserving wheatgrass has consistently achieved wheatgrass powder containing a minimum of forty percent protein. Not critical to the method of the present invention are the amount of wheatgrass juice freeze dried at one time, this being limited only by the holding capacity of the pharmaceutical freeze drier; the number of times per day that the wheatgrass spouts are watered with fertilized solution; and the number of times each wheatgrass plant is cut and allowed to regrow to the first node stage.

What is claimed is:

1. A method for growing and preserving nutrients in wheatgrass for use as a food supplement for animals, including humans, and wherein the wheatgrass powder produced thereby consistently has minimum protein levels of forty percent, said method comprising the steps of providing a pharmaceutical freeze drier apparatus, juice extracting means, support means for supporting wheatgrass during growth, a quantity of wheatgrass seeds, seed coating means, a quantity of storage containers, and a quantity of liquid fertilizer; coating said seeds with said seed coating means; placing one layer of said seeds on said support means; watering said seeds with said liquid fertilizer at least two times per day to produce wheatgrass for use as a food supplement; harvesting said wheatgrass at first node stage just before leafing ; using said juice extraction means to separate juice in said wheatgrass from the fibrous portion of said wheatgrass without heating said juice to a temperature greater than ninety degrees Fahrenheit; immediately after said juicing step using said pharmaceutical freeze drier to maintain said juice at temperatures below freezing and reduce said juice into a powder; placing said powder into said storage containers; and sealing said powder into said storage containers for later use.

2. The method of claim 1 wherein said step of providing said support means comprises the step of providing a quantity of sawdust and a quantity of vermiculite; and further comprising the steps of mixing equal amounts of said sawdust and said vermiculite to form a growth medium; placing at least one inch of said growth medium upon a flat surface; and using an additional amount of said growth medium sufficient to cover said seeds to cover them.

3. The method of claim 1 wherein the step of providing said juice extracting means further comprises a step of providing a low speed juicer having a large mesh screen.

4. The method of claim 1 wherein the step of providing said juice extracting means further comprises a step of providing a low pressure hydraulic press which generates no greater heat than 90° Fahrenheit.

5. The method of claim 1 wherein the step of providing said seed coating comprises the steps of providing a quantity of low N—P—K fertilizer and a quantity of water sufficient to coat said seeds, mixing one tablespoon of said low N—P—K fertilizer with two ounces of said water to form a seed coating mixture, and applying said seed coating mixture to approximately two pounds of said seeds.

6. The product produced by the method of claim 1.

7. A method for growing and preserving nutrients in wheatgrass for use as a food supplement for animals, including humans, and wherein the wheatgrass powder produced thereby consistently has minimum protein levels of forty percent, said method comprising the steps of providing a pharmaceutical freeze drier apparatus, juice extracting means, a quantity of sawdust, a quantity of vermiculite, a quantity of plant seeds, seed coating means, a quantity of storage containers, and a quantity of liquid fertilizer; mixing said sawdust and said vermiculite to form a growth medium; placing said growth medium upon a flat surface; coating said seeds with said seed coating means; placing one layer of said seeds upon said growth medium; covering said seeds with an additional amount of said growth medium; watering said seeds with said liquid fertilizer at least two times per day to produce plant material for use as a food supplement; harvesting said wheatgrass at first node stage just before leafing ; using said juice extracting means to separate juice in said wheatgrass from the fibrous portion of said wheatgrass without heating said juice to a temperature greater than ninety degrees Fahrenheit; immediately after said juicing step using said pharmaceutical freeze drier to maintain said juice at temperatures below freezing and reduce said juice into a powder; placing said powder into said storage containers; and sealing said powder into said storage containers for later use.

8. The method of claim 7 further comprising the step of providing a quantity of fertilizer having a high magnesium content as well as a nutrient mixture ranging between a minimum of 6N, 10P, 25K and 12N and a maximum of 12N 25P, and 29K, the step of providing a quantity of clean water, and the step of mixing said fertilizer with said water to form said liquid fertilizer.

9. The method of claim 7 wherein the step of providing said juice extracting means further comprises a step of providing a low speed juicer having a large mesh screen.

10. The method of claim 7 wherein the step of providing said juice extracting means further comprises a step of providing a low pressure hydraulic press which generates no greater heat than 90° Fahrenheit.

11. The method of claim 7 wherein the step of providing said seed coating comprises the steps of providing a quantity of low N—P—K fertilizer and a quantity of water sufficient to coat said seeds, mixing one tablespoon of said low N—P—K fertilizer with two ounces of said water to form a seed coating mixture, and applying said seed coating mixture to approximately two pounds of said seeds.

12. The method of claim 7 further providing the step of diffusing said storage bottles with oxygen prior to placing said powder therein.

13. The product produced by the method of claim 7.

14. A method for growing and preserving nutrients in wheatgrass for use as a food supplement for animals, including humans, and wherein the wheatgrass powder produced thereby consistently has minimum protein levels of forty percent, said method comprising the steps of providing a pharmaceutical freeze drier apparatus, juice extraction means, a quantity of sawdust, a quantity of vermiculite, a quantity of wheatgrass seeds, a quantity of storage containers, and a quantity of liquid fertilizer; mixing equal amounts of said sawdust and said vermiculite to form a growth medium; placing at least one inch of said growth medium upon a flat surface; coating said seeds with said seed coating means; placing one layer of said wheatgrass seeds upon said growth medium; covering said wheatgrass seeds with an additional amount of said growth medium; watering said wheatgrass seeds with said liquid fertilizer at least two times per day to produce wheatgrass for use as a food supplement; harvesting said wheatgrass prior to first node stage wherein said wheatgrass has optimum nutrient levels therein; using said juice extraction means to separate juice in said wheatgrass from the fibrous portion of said wheatgrass without heating said juice to a temperature greater than ninety degrees Fahrenheit; immediately after said juicing step using said pharmaceutical freeze drier at temperatures below freezing to reduce said juice into a powder; placing said powder into said storage containers; and sealing said powder into said storage containers for later use.

15. The method of claim 14 further comprising the step of providing a quantity of fertilizer having a high magnesium content as well as a nutrient mixture ranging between a minimum of 6N, 10P, 25K and 12N and a maximum of 12N, 25P, and 29K, the step of providing a quantity of clean water, and the step of mixing said fertilizer with said water to form said liquid fertilizer.

16. The method of claim 14 wherein the step of providing said juice extracting means further comprises a step of providing a low speed juicer having a large mesh screen.

17. The method of claim 14 wherein the step of providing said juice extracting means further comprises a step of providing a low pressure hydraulic press which generates no greater heat than 90° Fahrenheit.

18. The method of claim 14 wherein the step of providing said seed coating comprises the steps of providing a quantity of low N—P—K fertilizer and a quantity of water sufficient to coat said seeds, mixing one tablespoon of said low N—P—K fertilizer with two ounces of said water to form a seed coating mixture, and applying said seed coating mixture to approximately two pounds of said seeds.

19. The method of claim 14 further providing the step of diffusing said storage bottles with oxygen prior to placing said powder therein.

20. The product produced by the method of claim 14.

* * * * *